(12) United States Patent
Nedelman

(10) Patent No.: US 7,837,248 B2
(45) Date of Patent: Nov. 23, 2010

(54) TRIM SYSTEM FOR AN AUTOMOTIVE VEHICLE

(75) Inventor: Marc David Nedelman, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 12/103,308

(22) Filed: Apr. 15, 2008

(65) Prior Publication Data

US 2009/0256372 A1 Oct. 15, 2009

(51) Int. Cl.
*B60R 7/10* (2006.01)

(52) U.S. Cl. ............ 296/39.1; 52/716.5; 224/313; 296/1.08

(58) Field of Classification Search ............ 52/716.5, 52/716.6, 716.7, 718.02, 718.03; 224/313, 224/927; 296/1.02, 1.06, 1.07, 1.08, 39.1, 296/193.06, 214; 428/31
See application file for complete search history.

(56) References Cited

U.S. PATENT DOCUMENTS

| | | | | |
|---|---|---|---|---|
| 4,221,354 | A * | 9/1980 | Kempkers | 248/291.1 |
| 4,664,267 | A | 5/1987 | Clark | |
| 4,720,028 | A * | 1/1988 | Takemura et al. | 224/553 |
| 5,411,233 | A * | 5/1995 | Grimes et al. | 248/305 |
| 5,492,260 | A | 2/1996 | Rieden et al. | |
| 5,507,423 | A * | 4/1996 | Fischer et al. | 224/313 |
| 5,560,575 | A * | 10/1996 | Krysiak | 248/222.12 |
| 5,769,294 | A | 6/1998 | Heinz et al. | |
| 5,857,735 | A * | 1/1999 | Alonso Cuesta | 296/214 |
| 6,612,796 | B2 | 9/2003 | Gattone | |
| 6,692,067 | B2 * | 2/2004 | Inari et al. | 296/214 |
| 6,883,828 | B2 | 4/2005 | Ohki | |
| 6,955,395 | B2 * | 10/2005 | Oshina et al. | 296/214 |
| 6,959,954 | B2 * | 11/2005 | Brandt et al. | 296/1.08 |
| 7,226,023 | B2 * | 6/2007 | Banno et al. | 248/71 |
| 2002/0021014 | A1 * | 2/2002 | Sakuma et al. | 296/1.1 |
| 2002/0167187 | A1 * | 11/2002 | Murar | 296/39.1 |
| 2003/0094828 | A1 * | 5/2003 | Nagamoto | 296/39.1 |
| 2004/0160078 | A1 * | 8/2004 | Hwang | 296/39.1 |
| 2005/0092795 | A1 * | 5/2005 | Matthew et al. | 224/313 |
| 2006/0107609 | A1 | 5/2006 | Stringer et al. | |
| 2007/0046054 | A1 | 3/2007 | Hinman et al. | |
| 2007/0114766 | A1 * | 5/2007 | Hwang | 280/730.2 |
| 2007/0126215 | A1 * | 6/2007 | Choi | 280/730.2 |

FOREIGN PATENT DOCUMENTS

EP 88931 A2 * 9/1983

* cited by examiner

*Primary Examiner*—Glenn Dayoan
*Assistant Examiner*—Paul A Chenevert
(74) *Attorney, Agent, or Firm*—Gregory Brown; Brooks Kushman P.C.

(57) ABSTRACT

A trim panel is mounted to a structural member of an automotive vehicle via a fastener. The trim panel includes an opening in registration with the fastener. An integrated cover and hook fills at least a portion of the opening and permits and occupant to hang an item within the vehicle.

11 Claims, 6 Drawing Sheets

TRIM SYSTEM FOR AN AUTOMOTIVE VEHICLE

1. FIELD OF THE INVENTION

The invention relates to trim systems for automotive vehicles.

2. BACKGROUND ART

Automotive vehicles may be provided with storage hooks accessible from an interior of the vehicle. U.S. Pat. No. 5,769,294 to Heinz et al. discloses an example of a storage hook for an automotive vehicle. Heinz et al. provides a stowable accessory hook for an automobile that is supported in a surrounding wall structure having an opening defined by a peripheral rim. Distal tips of the hooks are recessed behind the peripheral rim of the surrounding wall structure to protect against inadvertent snagging and abrasions. A pair of sockets are formed behind the surrounding wall to rotatably receive a pair of pintles extending from a concave cup disposed in the opening in the surrounding wall structure. The cup is manually rotated about a horizontal pivot axis between stowed and operative positions. In the stowed position the tips are recessed. Either single or multiple cantilever hooks extend from the cup for securing plastic grocery and merchandise sacks, garment hangers, or the like. The cup may have a back wall which geometrically conforms to the opening in the surrounding wall structure to close the opening when the cup is in the stowed position. The back wall includes a finger catch offset laterally from the pivot axis to facilitate manipulation between the stowed and operative positions.

U.S. Pat. No. 5,492,260 to Rieden et al. discloses another example of a storage hook for an automotive vehicle. Rieden et al. provides a garment support assembly that includes a base element mounted on a vehicle wall. The base element has a transversely extending groove which is located adjacent the vehicle wall. The garment support assembly also includes a single continuous ring element. The ring element includes an inverted U-shaped hanger receiving portion closed by a transversely extending rod portion. The rod portion is slip-fittedly seated in the groove on the base element and is captured between the base element and the vehicle wall, thus pivotally connecting the ring element to the base element. This pivotal connection allows the ring element to move between a stored position in which the ring element is located in the same transversely extending vertical plane as the base element and an open position in which the hanger receiving portion projects into the interior space of the vehicle for receiving hangers thereon.

U.S. Pat. No. 4,664,267 to Clark discloses yet another example of a storage hook for an automotive vehicle. Clark provides a garment hanging device for a vehicle body that includes a support attached to the vehicle body and that defines a downwardly opening inverted U-shaped channel having opposed lip portions extending toward one another and providing an entry opening into a cavity. A garment hanger adapted to be removably affixed to the support has a garment hanging bow depending from an inverted J-shaped hook portion. The hook portion is adapted for entry upwardly into the entry opening of the support and has a distal end engageable with one of the lip portions of the channel. The hook portion of the garment hanger also has an inverted J-shaped hook latch portion pivotally mounted thereon and adapted for entry upwardly into the entry opening of the support and has a distal end engageable with the other lip portion of the channel. A spring acts between the hook portion and the hook latch portion to urge the hook latch portion away from the hook portion where by the garment hanger is secured within the cavity of the channel. A pushbutton handle provided on the hook latch portion and permits pivotal retracting movement of the hook latch portion toward the hook portion for removal of the garment hanger from the support.

Fasteners that may otherwise be visible from an interior of an automotive vehicle may be covered, for example, to enhance the appearance of the interior of the automotive vehicle. U.S. Pat. Pub. 2006/0107609 to Stringer et al. discloses an example of such a cover. Stringer et al. provides a garnish system for a vehicle. The system comprises a garnish having a patterned surface with styling features, a cavity, and a mounting aperture within the cavity for receiving a fastener to attach the garnish to a mounting structure. A cover is shaped to engage and close the cavity such that the cover, which is patterned to correspond to the styling features of the garnish, visually obscures the cover when the cover is installed.

SUMMARY

Embodiments of the invention may take the form of a trim panel system for concealing a structural member of an automotive vehicle. The trim panel system includes a trim panel mounted over the structural member and an access panel secured to the trim panel. The structural member has a fastener engaged therewith. The trim panel has an inner surface facing the structural member and an outer surface. The trim panel also has an additional surface defining an opening in the trim panel in registration with the fastener. The access panel is configured to fill the opening in the trim panel. The access panel includes a hook portion projecting away from the outer surface of the trim panel.

Embodiments of the invention may take the form of a trim panel system for covering a structural member of an automotive vehicle. The structural member at least partially defines a cabin of the vehicle. A fastener is engaged with the structural member. The trim panel system includes a trim panel covering the structural member. The trim panel includes a surface defining an aperture in the trim panel. The aperture is in registration with the fastener. The trim panel system also includes a cover plate being configured to conceal the aperture of the trim panel. The cover plate includes a hook member projecting into the cabin of the vehicle and an anchor member projecting away from the cabin of the vehicle. The anchor member is configured to orient the cover plate relative to the aperture of the trim panel if in a first position and to secure the cover plate to the trim panel if in a second position.

Embodiments of the invention may take the form of an integrated access panel and item hook for an interior of an automotive vehicle. The vehicle has a cabin defined by a plurality of structural members. One of the structural members has a fastener and trim panel mounted thereon. The trim panel includes a surface defining an opening in registration with the fastener. The integrated access panel and item hook includes a panel portion being configured to cover the opening in the trim panel, a hook portion projecting into the cabin and an anchor portion being configured to secure the integrated access panel and item hook to the trim panel.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

Fasteners may be used to mount trim panels to structural members of automotive vehicles. Some trim panels include openings through which the fasteners pass during mounting. These openings may have an undesirable appearance and are often covered. As an example, a pillar trim panel may include an opening that permits an operator to assemble the trim panel to a pillar with a screw. The opening may then be covered with a screw cover.

Figure 1:
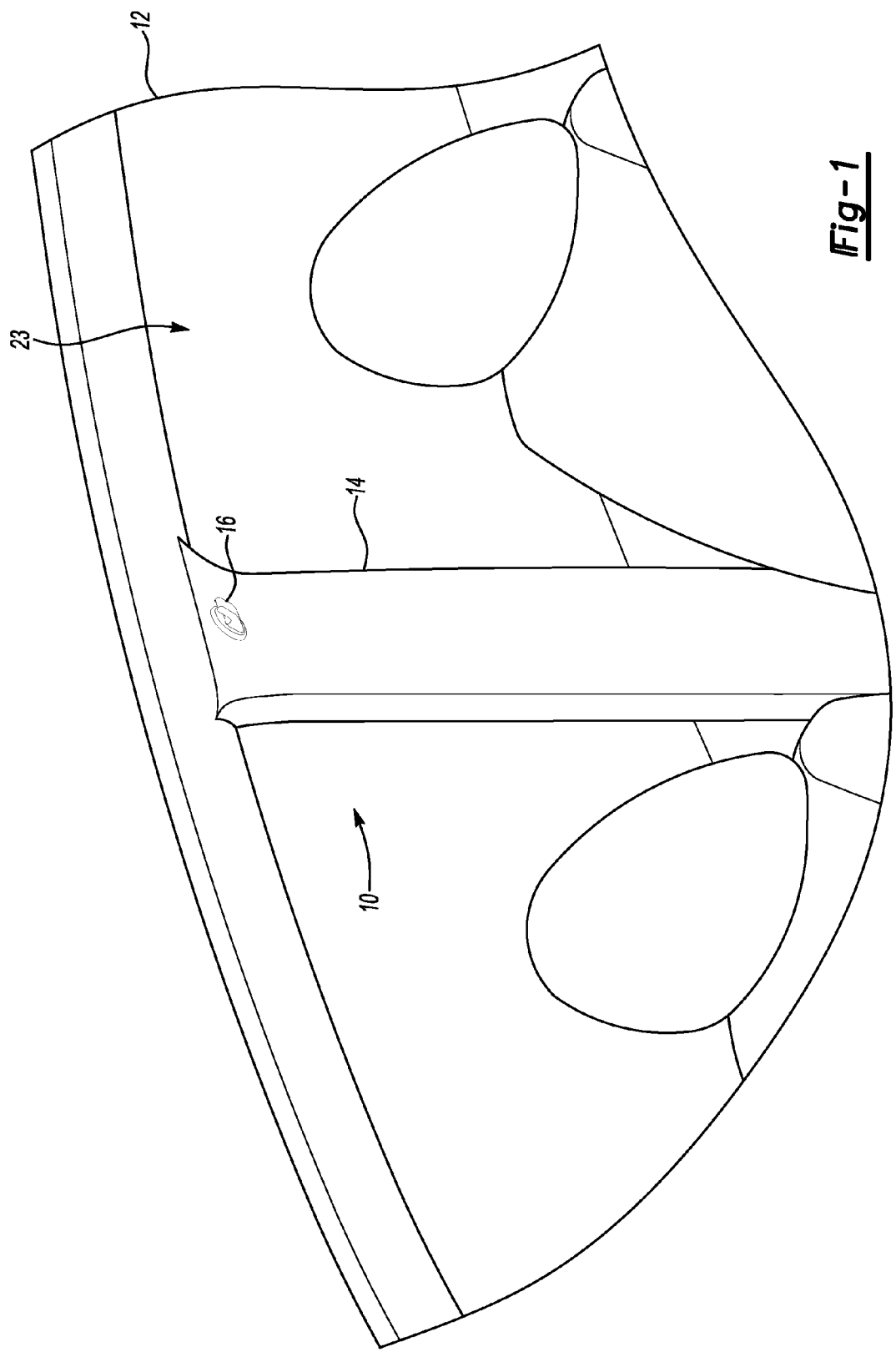
FIG. 1 is a perspective view of a portion of a vehicle interior including a trim panel system according to certain embodiments of the invention.

Referring to FIG. 1, a trim system 10 for an automotive vehicle 12 includes a trim panel 14 and a cover and hook 16. As explained in more detail below, the cover and hook 16 covers a fastener 18 (FIG. 2), e.g., a screw, and an opening 20 (FIG. 2) associated with the trim panel 14. The cover and hook 16 also permits an occupant to hang items in the vehicle 12.

Figure 2:
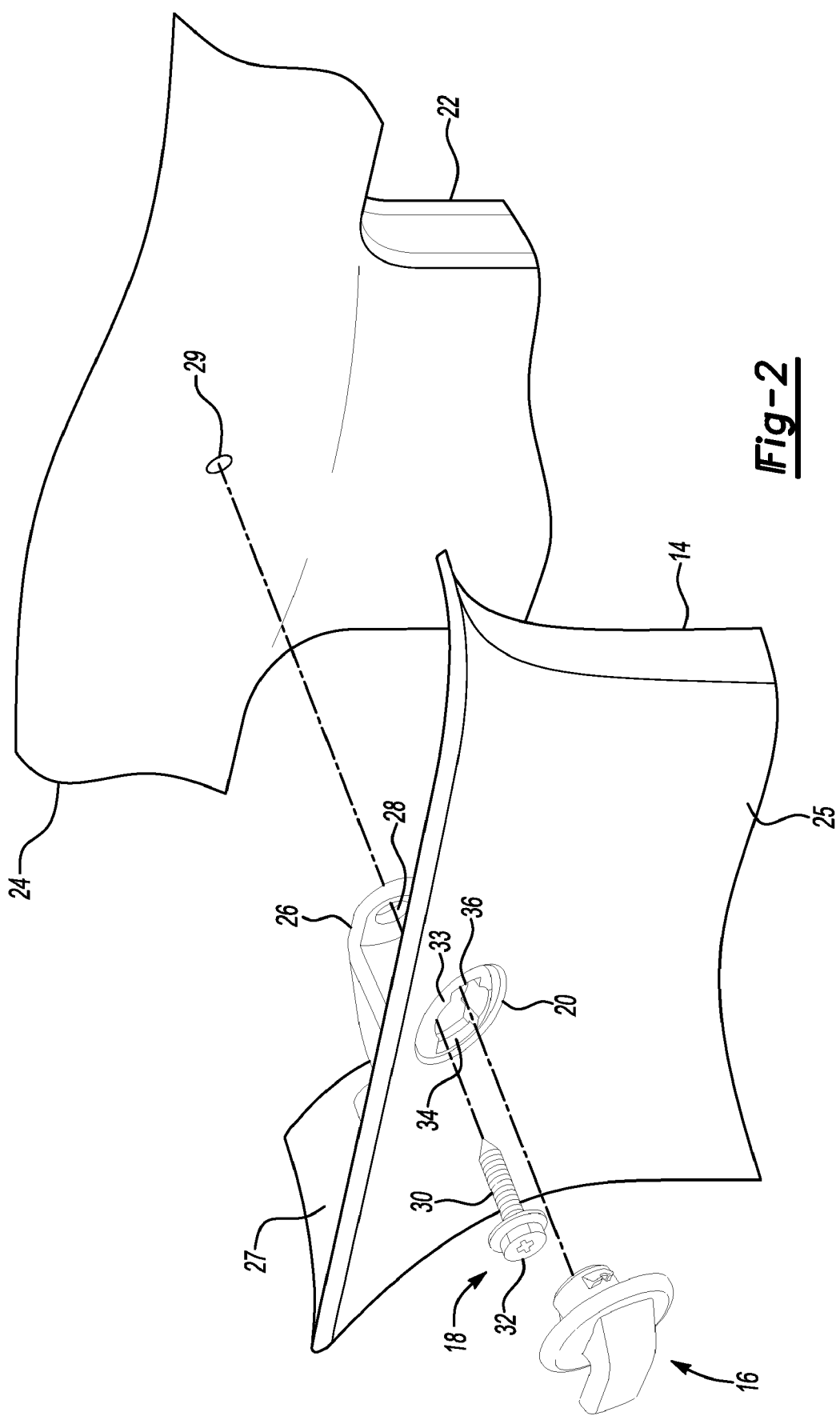
FIG. 2 is an exploded assembly view of a portion of the trim panel system of FIG. 1.

Referring to FIG. 2, the trim panel 14 covers a pillar 22. The pillar at least partially defines a cabin 23 (FIG. 1) of the vehicle 12. The trim panel 14 includes an outer surface 25 and an inner surface 27. The outer surface 25 faces the cabin 23. The inner surface 27 faces the pillar 22. In other examples, the trim panel 14 may cover other portions of the vehicle 12. As an example, the trim cover 14 may cover a portion of a roof 24 of the vehicle 12.

The trim panel 14 includes the opening 20 that permits the fastener 18 to pass through it when the trim panel 14 is being mounted to the pillar 22 by inserting the fastener 18 into an opening 29. The opening 20 provides access to a leg portion 26 of the trim panel 14. The leg portion 26 includes an opening 28 that permits a threaded portion 30 of the fastener 18, but not a head portion 32, to pass through it. The leg portion 26, and thus the trim panel 14, is held in place relative to the pillar 22 when the fastener 18 is mounted to the pillar 22.

Figure 3:
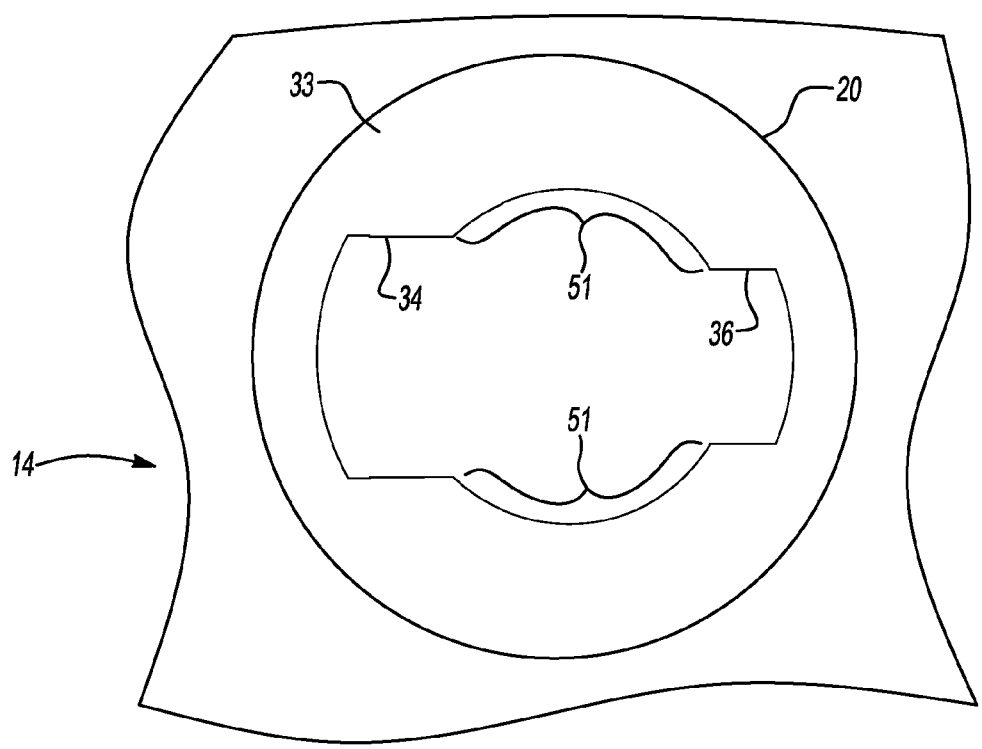
FIG. 3 is an enlarged front view of a portion of the trim panel system of FIG. 1.

Referring to FIG. 3, a panel reinforcement 33 formed in the trim panel 14 includes key ways 34, 36 to orient the cover and hook 16 relative to the trim panel 14 during assembly. The key ways 34, 36 are generally rectangularly shaped and differ in size. The key way 34 is larger than the key way 36. In other examples, the key ways 34, 36 may have a different shape. As an example, the key ways 34, 36 may be triangularly shaped and have the same size. As another example, the key way 34 may be rectangularly shaped and the key way 36 may be triangularly shaped. In still other examples, there may be more or less key ways as compared to that in FIG. 3. Other configurations are also possible.

Figure 4:
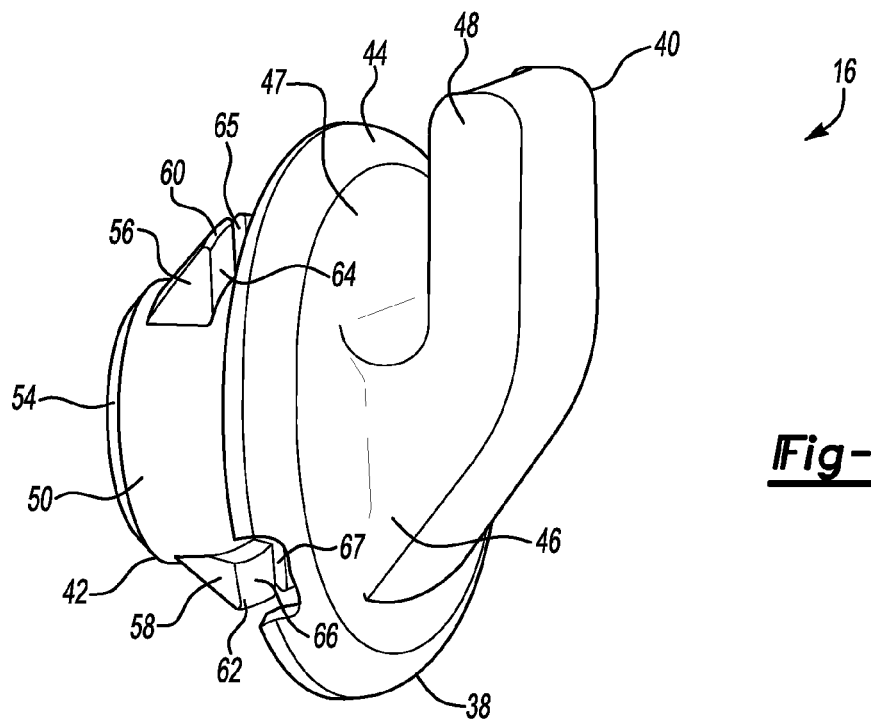
FIG. 4 is a perspective view of the cover and hook of FIG. 1.
Figure 5:
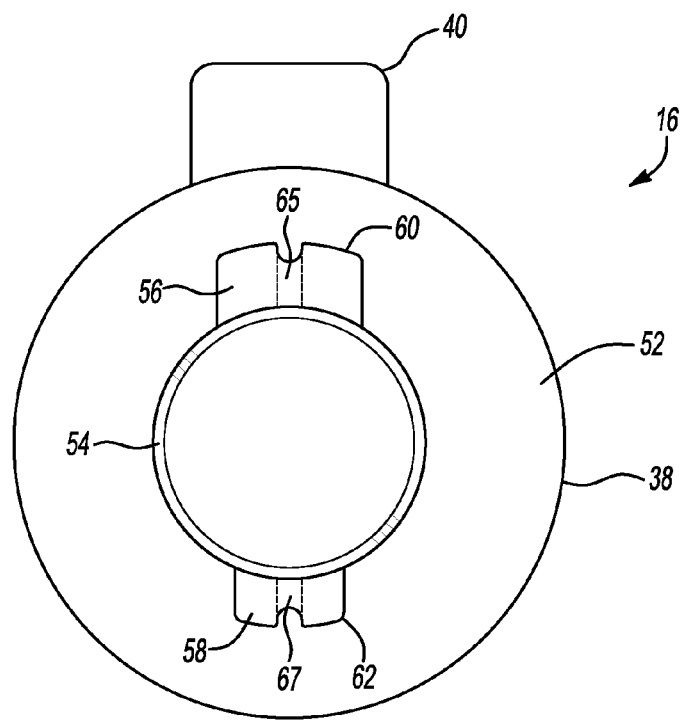
FIG. 5 is a rear view of the cover and hook of FIG. 4.

Referring to FIGS. 4 and 5, the cover and hook 16 includes a cover portion 38, a hook portion 40 and an anchor portion 42. The cover portion 38 is generally circular and is sized to be received within the opening 20. The cover portion 38 includes a chamfered edge 44. The cover portion 38 has a surface similar to that of the trim panel 14 to obscure the transition from the trim panel 14 to the cover portion 38 as well as enhance the appearance of the cover and hook 16. In other examples, the cover portion 38 may have a different size, shape and/or surface finish. As an example, the cover portion 38 may be rectangularly shaped and cover the opening 20. Other configurations and arrangements are also possible.

A base 46 of the hook portion 40 extends away from an outer surface 47 of the cover portion 38 and curls up to an end 48. An item hung from the cover and hook 16 is retained cooperatively by the outer surface 47 and hook portion 40. The hook portion has a surface similar to that of the trim panel 14 to enhance the appearance of the cover and hook 16.

The anchor portion 42 includes a generally cylindrical base 50 that extends normally away from an inner surface 52 of the cover portion 38. The generally cylindrical base 50 is sized to be received by cylindrical portions 51 (FIG. 3) associated with the panel reinforcement 33 (FIG. 3). That is, the outer diameter of the generally cylindrical base 50 is less than the inner diameter formed by the cylindrical portions 51. The generally cylindrical base 50 includes a chamfered end 54 to assist in locating the base 50 relative to the cylindrical portions 51. In other examples, the base 50 may have any suitable shape that permits it to be received by the cylindrical portions 51. As an example, the base 50 may have a conical shape. In the example of FIGS. 4 and 5, the base 50 is hollowed to decrease the weight of the cover and hook 16. In other examples, the base 50 may be partially hollowed or solid as design and/or other considerations dictate.

The anchor portion 42 also includes keys 56, 58 that are positioned on opposite sides of the periphery of the generally cylindrical base 50. The keys 56, 58 extend normally away from the base 50 and taper to ends 60, 62 respectively. The key 56 is larger than the key 58. The dimensions of the keys 56, 58 correspond to the dimensions of the key ways 34, 36 associated with the trim panel 14. That is, the keys 56, 58 are each sized to be received by the key ways 34, 36 respectively so that the cover and hook 16 can thus only be inserted into the opening 20 in one orientation. In other examples, the keys 56, 58 can take any suitable shape to be received by the key ways 34, 36. Additionally, the number of keys provided corresponds to the number of key ways associated with the trim panel 14. As an example, if the trim panel 14 includes four key ways, the anchor portion 42 may include up to four keys. Other arrangements and configurations are also possible.

The keys 56, 58 include retaining surfaces 64, 66 respectively. The retaining surfaces 64, 66 are spaced away from the inner surface 52 of the cover portion 38 at a distance that is approximately the same as the thickness of the panel reinforcement 33 of the trim panel 14 in the vicinity of the opening 20. The retaining surfaces 64, 66 and cover portion 38 sandwich the panel reinforcement 33 of the trim panel 14 between them once the cover and hook 16 is installed with the trim panel 14. The keys 56, 58 also include recesses 65, 67 respectively. As explained in more detail below, the recesses 65, 67 cooperate with the panel reinforcement 33 to resist rotational movement of the cover and hook 16 when it is installed.

Referring again to FIG. 2, to install the cover and hook 16 with the trim panel 14, the keys 56, 58 of the anchor portion 42 are aligned with the respective key ways 34, 36 of the trim panel 14 and inserted into the opening 20. Once inserted, the cover and hook 16 is rotated approximately 90° clockwise.

Figure 6:
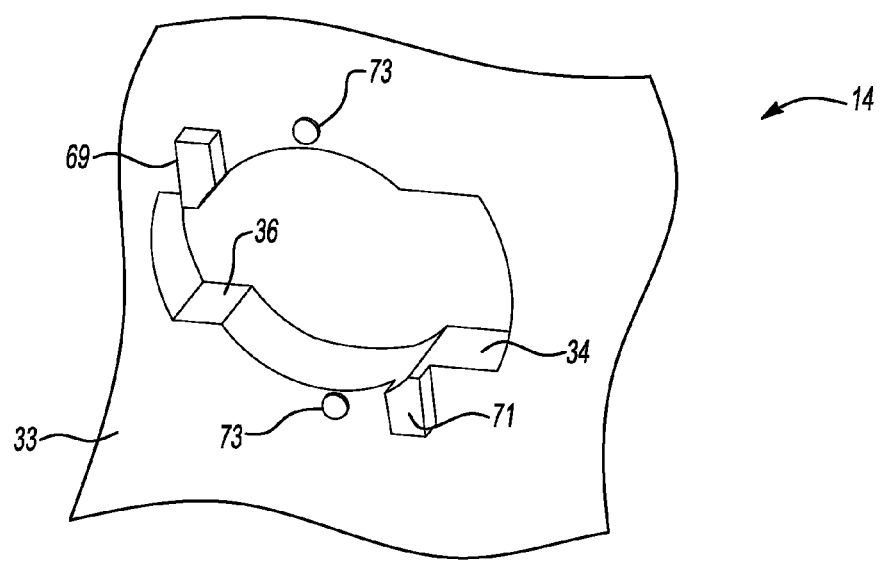
FIG. 6 is an enlarged rear perspective view of a portion of the trim panel system of FIG. 1.

Referring to FIG. 6, stops 69, 71 formed in the panel reinforcement 33 make respective contact with the keys 56, 58 after the cover and hook 16 has been rotated approximately 90° clockwise.

Projections 73 formed in the panel reinforcement 33 rest within the recesses 65, 67 of the keys 56, 58 after the cover and hook 16 has been rotated approximately 90° clockwise. The projections 73 and recesses 65, 67 cooperate to resist rotational movement of the integrated cover and hook 16 after it is installed. Of course, other configurations are also possible. For example, a tab may be formed on the anchor portion 42. This tab may be received, when installed, by a notch formed in the panel reinforcement 33.

Figure 7:
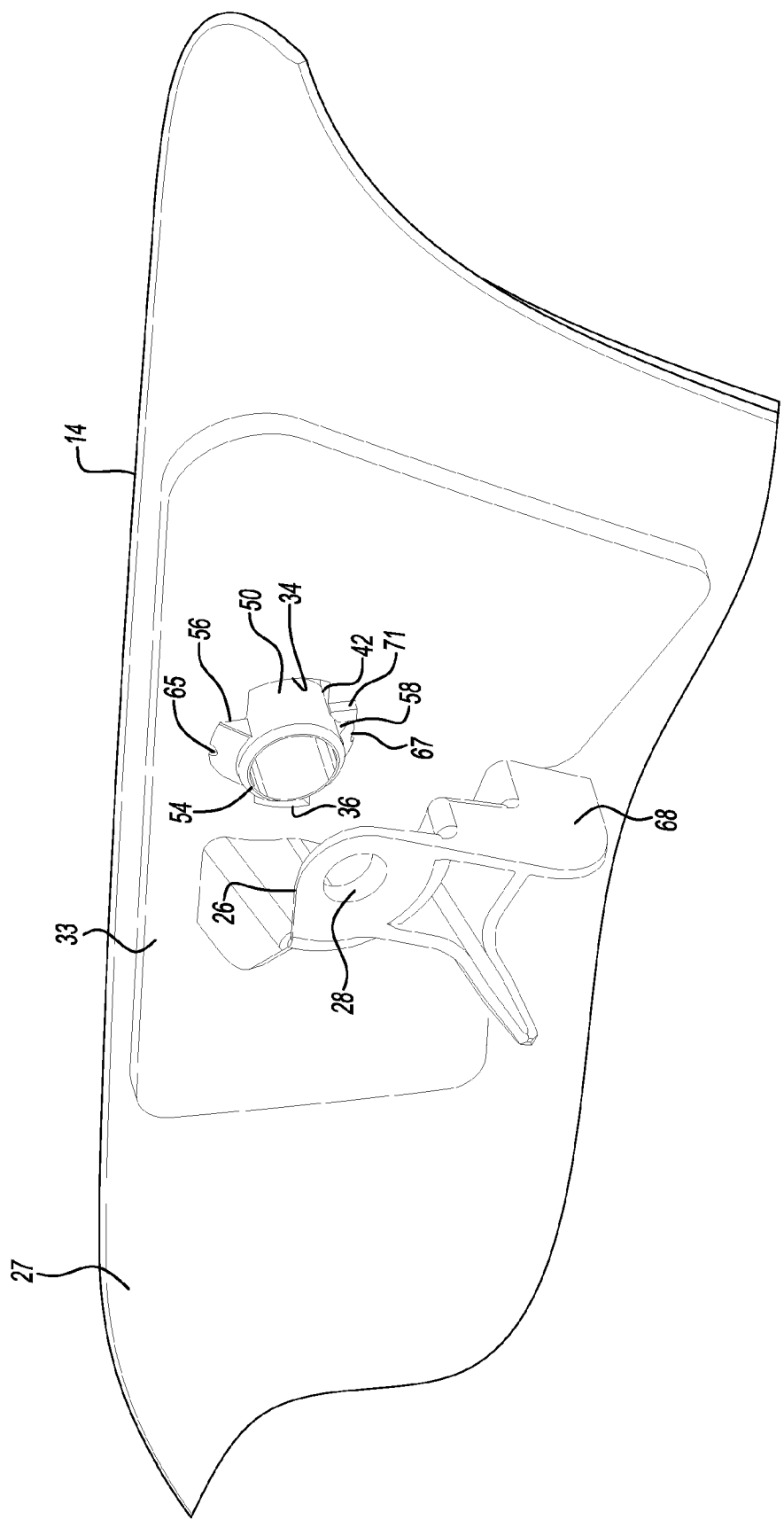
FIG. 7 is another enlarged rear perspective view of a portion of the trim panel system of FIG. 1.

Referring to FIG. 7, the cover and hook 16 is in the installed position relative to the trim panel 14. The thickness of the panel reinforcement 33 is greater than the thickness around the periphery of the trim panel 14. This increased thickness provides additional support for the cover and hook 16 particularly in circumstances where an item is hung from the cover and hook 16.

A riser 68 formed with the trim panel 14 spaces the leg portion 26 away from the rear surface 27 of the trim panel 14 in order to provide room for the anchor portion 42 of the cover and hook 16 between the pillar 22 and the trim panel 14. Other configurations and arrangements are also possible.

Figure 8:
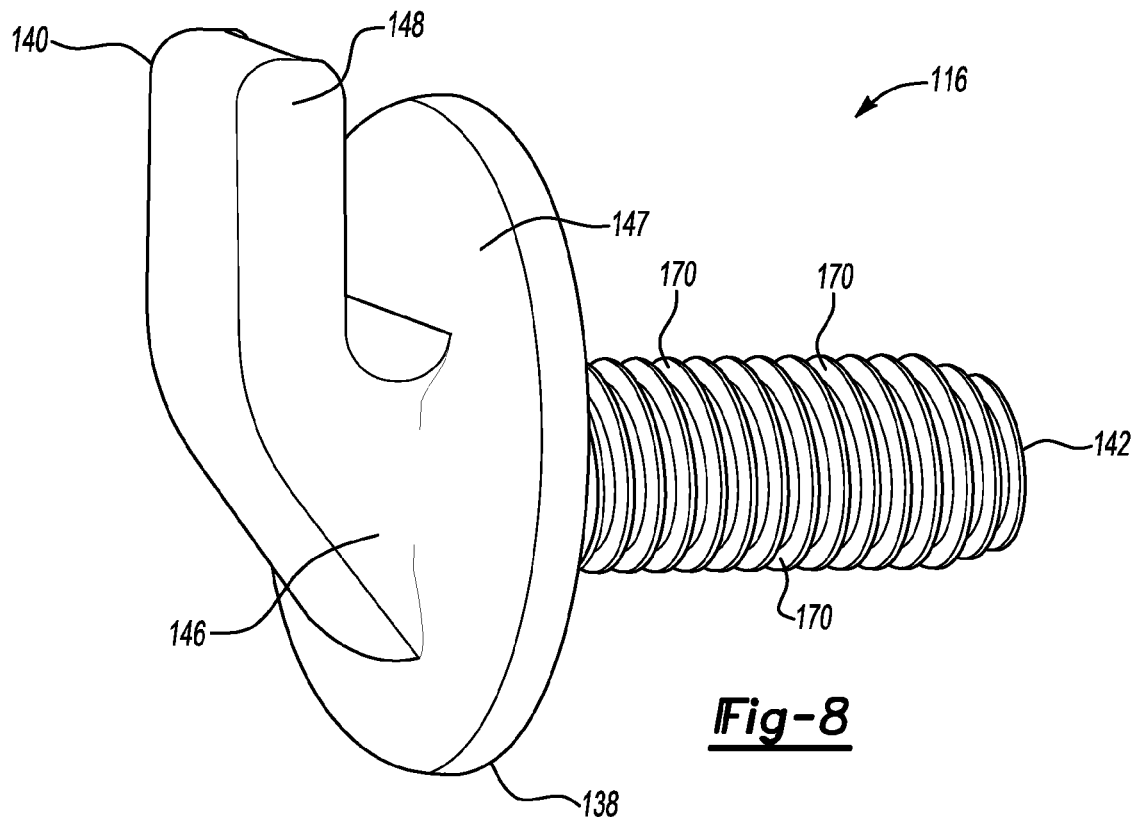
FIG. 8 is a perspective view of another cover and hook according to certain embodiments of the invention.

Referring to FIG. 8, a cover and hook 116 includes a cover portion 138, a hook portion 140 and an anchor portion 142. Numbered elements of FIG. 8 that differ by 100 relative to numbered elements of FIGS. 4 and 5 have similar, although not necessarily identical, descriptions to the numbered elements of FIGS. 4 and 5. The anchor portion 142 includes a series of exterior threads 170 that permit the anchor portion 142 to engage a complimentary set of interior threads associated with an opening of a trim panel (not shown). To install the cover and hook 116, the anchor portion 142 is inserted into the opening and rotated until the exterior threads 170 fully engage the interior threads and the cover portion 138 at least contacts the trim panel.

Figure 9:
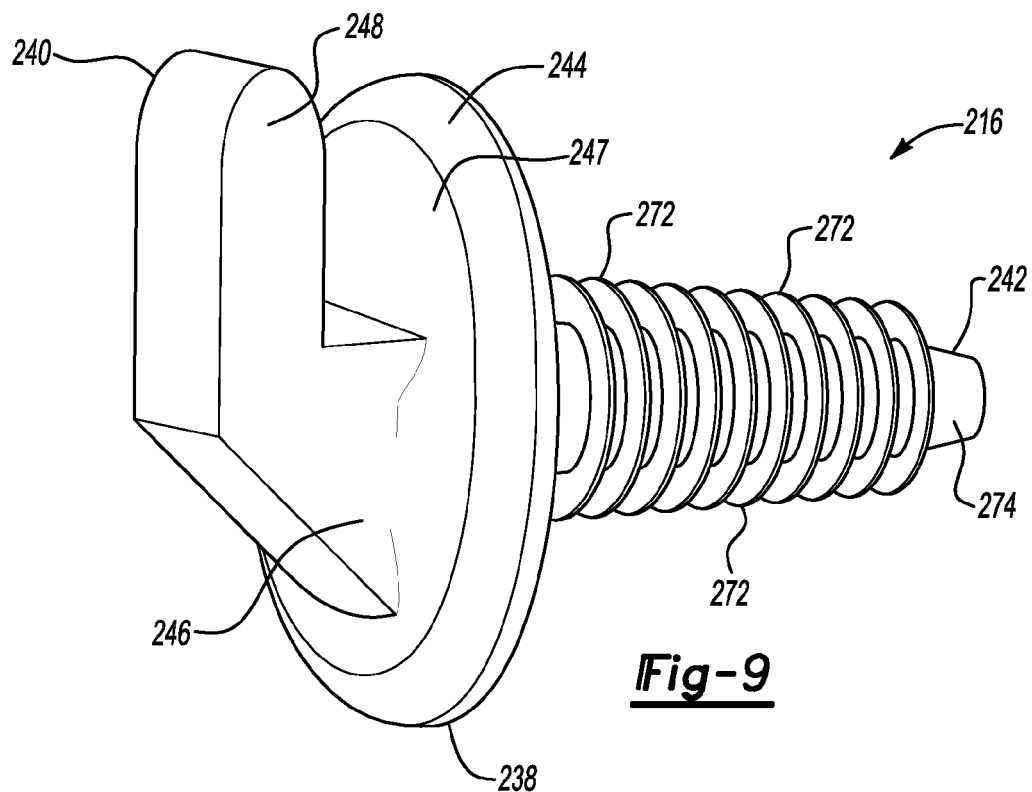
FIG. 9 is a perspective view of yet another cover and hook according to certain embodiments of the invention.

Referring to FIG. 9, a cover and hook 216 includes a cover portion 238, a hook portion 240 and an anchor portion 242. Numbered elements of FIG. 8 that differ by 200 relative to numbered elements of FIGS. 4 and 5 have similar, although not necessarily identical, descriptions to the numbered elements of FIGS. 4 and 5. The anchor portion 242 includes a plurality of flexing retainers 272, e.g., Christmas tree retainers, retrose fins, etc., formed on a column member 274 of the anchor portion 242. The outer diameter of the flexing retainers 272 is greater than the inner diameter of an opening associated with a trim panel (not shown). To install the cover and hook 216, the anchor portion 242 would be pushed into the opening of the trim panel until the cover portion 238 rests adjacent to the trim panel. To remove the cover and hook 216, the cover and hook 216 would be pulled away from the trim panel. Other configurations and arrangements are also possible. As an example, the cover and hook 216 may be snapped in place relative to the trim panel with any suitable anchoring device.

The covers and hooks 16, 116, 216 are injection molded plastic components. Other materials and manufacturing techniques may also be used. As an example, the covers and hooks 16, 116, 216 may be cast in metal.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A trim panel system for concealing a structural member of an automotive vehicle, the structural member having a fastener engaged therewith, the system comprising:
   a trim panel mounted over the structural member and having an inner surface facing the structural member and an outer surface, the trim panel having an additional surface defining an irregularly shaped opening in the trim panel in registration with the fastener; and
   an access panel secured to the trim panel and being configured to fill the opening in the trim panel, the access panel including a hook portion projecting away from the outer surface of the trim panel and an anchor (i) projecting away from the inner surface of the trim panel, (ii) being configured to secure the access panel to the trim panel, and (iii) including a projection configured to pass through the irregularly shaped opening to orient the access panel relative to the trim panel.

2. The system of claim 1 wherein the projection has a substantially triangular cross-section.

3. The system of claim 1 wherein the anchor comprises a non-destructive anchor.

4. The system of claim 1 wherein the anchor includes a column member and wherein the projection is formed on the column member.

5. The system of claim 4 wherein the column member is at least partially hollow.

6. A trim panel system for covering a structural member of an automotive vehicle, the structural member at least partially defining a cabin of the vehicle and having a fastener engaged therewith, the system comprising:
   a trim panel covering the structural member and including a surface defining an aperture in the trim panel, the aperture in registration with the fastener; and
   a cover plate being configured to conceal the aperture of the trim panel, the cover plate including a hook member projecting into the cabin of the vehicle and an anchor member projecting away from the cabin of the vehicle, the anchor member including a projection configured to orient the cover plate relative to the aperture of the trim panel if in a first position and to secure the cover plate to the trim panel if in a second position.

7. The system of claim 6 wherein the projection has a substantially triangular cross-section.

8. The system of claim 6 wherein the anchor member comprises a non-threaded anchor.

9. The system of claim 6 wherein the anchor member comprises a non-destructive anchor.

10. The system of claim 6 wherein the anchor member further includes a column member and wherein the projection is formed on the column member.

11. The system of claim 10 wherein at least a portion of the column member is hollow.

* * * * *